Figure 3:
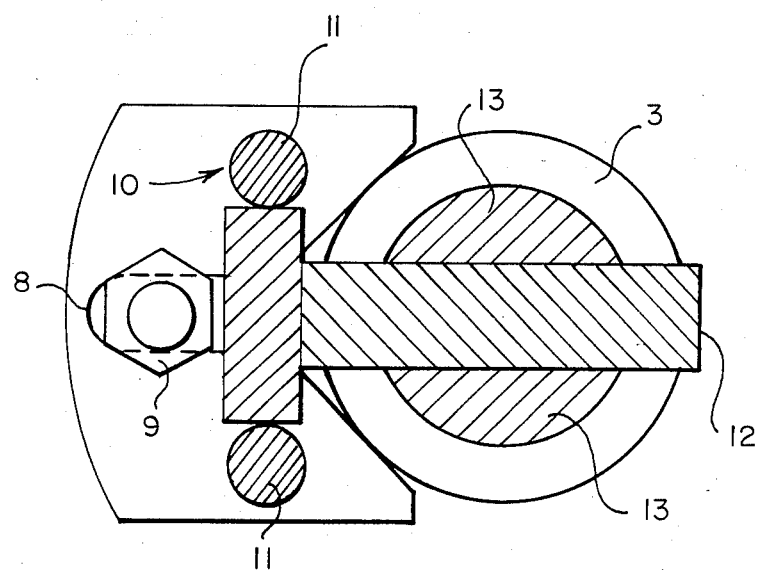

United States Patent [19]

Haanschoten

[11] Patent Number: 4,703,977
[45] Date of Patent: Nov. 3, 1987

[54] COUPLING MEMBER FOR WHEEL BOLTS OF WHEEL SUPPORTS

[76] Inventor: Jozef G. Haanschoten, Haspel 18, 3905 NB Veenendaal, Netherlands

[21] Appl. No.: 830,946

[22] Filed: Feb. 19, 1986

[30] Foreign Application Priority Data

Mar. 1, 1985 [NL] Netherlands .......................... 8500575

[51] Int. Cl.$^4$ ............................................. B60B 35/14
[52] U.S. Cl. .................................. 301/124 R; 82/4 A; 82/40 R; 301/130; 464/102
[58] Field of Search ............... 82/4 A, 40 R; 464/102, 464/104; 301/124 R, 130, 128

[56] References Cited

U.S. PATENT DOCUMENTS

| 757,735 | 4/1904 | George | 464/104 |
| 1,380,870 | 6/1921 | Lewis | 301/130 |
| 1,791,546 | 2/1931 | Wise | 82/4 A |

FOREIGN PATENT DOCUMENTS

| 705978 | 5/1941 | Fed. Rep. of Germany | 82/40 R |
| 2745111 | 4/1979 | Fed. Rep. of Germany | 82/4 A |
| 24032 | 2/1922 | France | 464/102 |
| 135712 | 5/1952 | Sweden | 82/40 R |
| 169903 | 10/1921 | United Kingdom | 82/40 R |

Primary Examiner—David A. Scherbel
Attorney, Agent, or Firm—Larson and Taylor

[57] ABSTRACT

A coupling member (7,10,11,12) is shown for fastening to a wheel support (2-6) of a car, which member has an oblong hole (8) located in the line symmetry of a V-shaped recess and a connecting rod (12) parallel to said line, so that by tightening only one bolt or mutter a perfect mounting and positioning of the member is possible with respect to the rotational axis (1) of the wheel support, with the connecting rod always being located exactly above said rotational axis.

11 Claims, 3 Drawing Figures

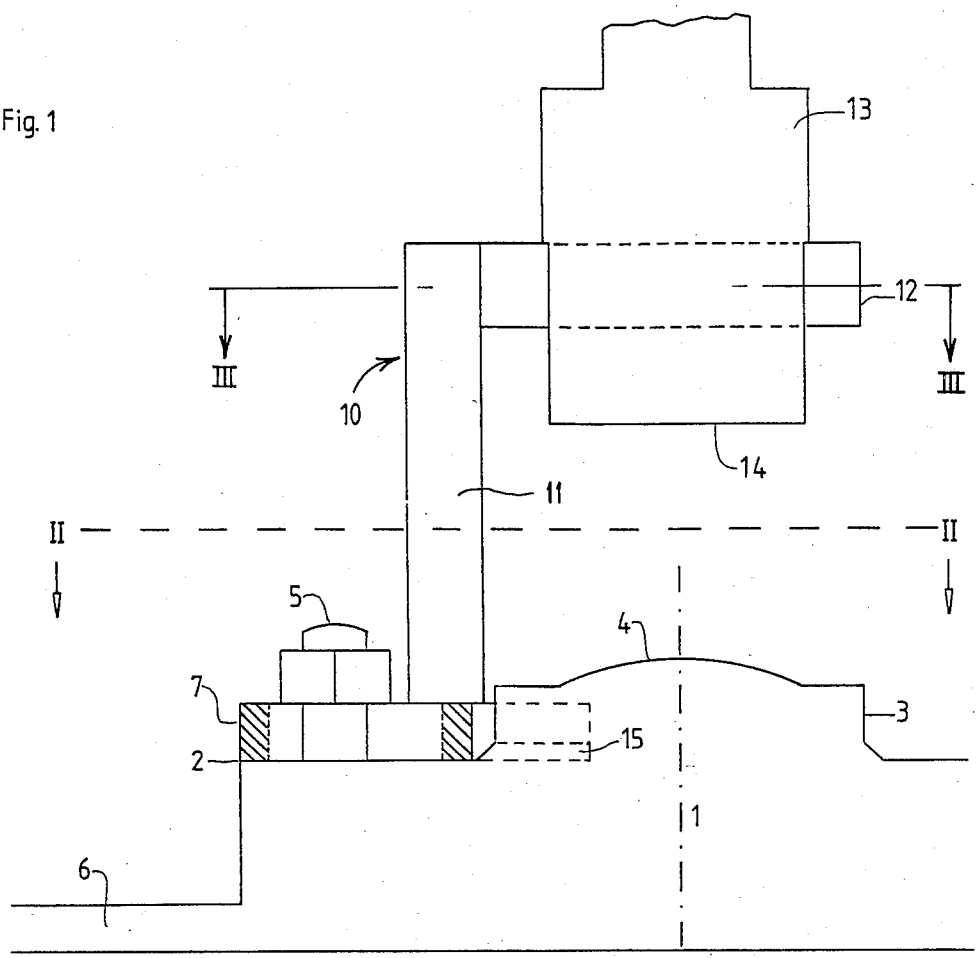
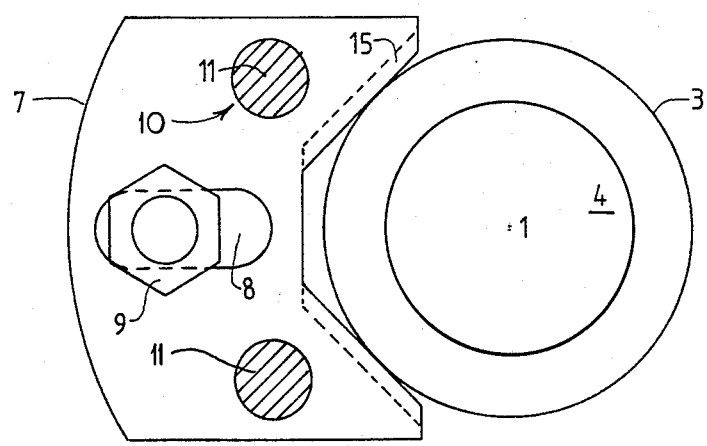

COUPLING MEMBER FOR WHEEL BOLTS OF WHEEL SUPPORTS

The invention relates to a coupling member for a wheel support of a vehicle which wheel support is provided with a number of wheel bolts protruding from a plane abutment surface and circularly symmetrically positioned with respect to the rotational axis of the wheel support, and with a central hub end part positioned coaxially therewith, which coupling member has an abutment surface for cooperation with the abutment surface of the wheel support and at least one opening for letting pass a wheel bolt of the wheel support to be fastened itself by a mutter screwed on the wheel bolt or the wheel bolt itself and a driving device for a wheel support provided with such a coupling member.

Driving a wheel support not having any wheel any longer is important for instance with maintenance of motor vehicles, if one wants to true up a braking disc, without removing that disc from the vehicle. This can happen by grinding or turning.

Though the wheel support of a driven wheel of a motor vehicle can be milled with use of the drive of the motor vehicle, this is not true for the non driven wheels. Also it is impossible to rotate in this way a wheel of towed, non-self propelled vehicles. Finally it is very well possible that the motor driving force of the motor vehicle is not available or that for other reasons it is undesirable to use that drive.

In such cases for driving the wheel support it is common to couple it with a drive. Therewith coupling occurs because a coupling member as described above is fastened by means of two or more wheel bolts. Therewith a difficulty is, that the number of wheel bolts varies, wherewith a number of three, four or five occur relatively frequently. Moreover varies the radial distance from the axis of the wheel bolts to the rotational axis of the wheel support with different types of vehicles. For these reasons up till now coupling members have been used which were only suitable for certain types of vehicles, for instance plates with three holes for cars having three wheel bolts, plates or members with two openings for wheel supports with four wheel bolts, whereas with supports for wheels with five wheel bolts generally again a member with three holes was used for letting pass the wheel bolts. Also different coupling plates were necessary with different radial distances from the wheel bolts to the hub axis.

Apart from this complication that in this way always a fitting coupling member has to be available for each type of wheel support, the known device showed the disadvantage that at least two mutters or bolts had to be applied and tightened.

The invention aims to provide a coupling member which without any modification can be applied to all up till now usual wheel supports and wherewith only one mutter or wheel bolt has to be tightened.

The above aims are attained according the invention in that the coupling member has only one oblong opening for receiving a wheel bolt and a V-shaped edge, the line of symmetry of said V mainly coinciding with the greater dimension of the oblong opening, which coupling member further has a connecting member which is symmetrical with respect to a plane passing through said line of symmetry and is perpendicular to the abutment surface.

The coupling member of the invention is located with its oblong opening around one of the wheel bolts and shoven toward the centre of the wheel support until the V-shaped edge abuts the central hub end part and thereby centers the coupling member. In this position a mutter is screwed on the concerned wheel bolt or the wheel bolt itself is tightened. Then the coupling member is fastened by the bolt and the two points of contact with the central hub end part and consequently is well fixed in the rotational sense. The connecting member always passes through the rotational axis of the wheel support, by reason of which it is simple to connect it to a driving member.

Experience has shown that such a coupling member gives a completely satisfying coupling, is simple and easy to handle and saves time with for instance trueing up of braking discs.

Preferably the connecting part is a straight rod parallel to the abutment surface. Such a rod can extremely well cooperate with a two-pronged fork-like driving member.

A sound and simple embodiment of the invention consists in that the connecting member is connected by means of a brace to a part containing the abutment surface, which brace leaves some free space at both sides of the oblong opening. In this way surveyability is combined with simplicity of construction, wherewith nevertheless always sufficient space is available around a wheel bolt protruding from the oblong opening to be able to righten or loosen its head or a mutter screwed on it by means of for instance a pick-lock.

According to a further elaboration of the invention it is provided that the rod has a circular cross-section. It has appeared that such a rod, when coupled to a two pronged-like driving member with mutual parallel surfaces gives a good drive even if the axis of rotation of the driving member is not exactly located in the extension of the rotational axis of the wheel support.

In order to obtain a good abutment against the central hub end part, also when it is not perfectly cilindrical up till the abutment surface, for instance by soil at the edge or a rounding, it is preferably provided that the walls are chamfered toward the abutment surface.

The invention also encompasses a driving device for a wheel support, provided with a coupling member as described above which driving device is characterized in that a motor driving device is provided with an output shaft, which at its end bears a fork adapted to encompass the connecting member of the coupling member.

The invention in the following is further elucidated on hand of the drawing in which:

FIG. 1 schematically shows a side view, partially in cross-section, of a wheel hub with braking disc and mounted to it a coupling member according to the invention;

FIG. 2 shows a top view of the device of FIG. 1, taken along line II—II, partially in cross-section, and FIG. 3 shows the hub including a cross section taken along line III—III of FIG. 1.

In FIG. 1 the axis, denoted 1, of a hub has been shown, an abutment a support surface 2, a cylindrical wall 3 and a central hub boss and a so-called grease head 4. From the support surface 2 a wheel bolt 5 protrudes upwardly, which can cooperate with a wheel mutter or nut 9. Of course the invention is also applicable with wheel bolts screwed into a wheel support. Further a braking disc 6 has been illustrated.

On the abutment surface 2 a coupling member according to the invention has been applied, the coupling member including a base plate 7 the under side of which defines an abutment surface supported on the abutment surface 2. As is more particularly visible in FIG. 2 the base plate 7 has a V-shape at its side directed toward the hub axis 1. The inner walls of the V-shaped recess contact the cylindrical wall of the boss 4. After arranging the coupling member in the illustrated position, which is possible because in the base plate 7 an oblong opening 8 has been provided, the mutter 9 is tightened after which the whole assembly is immovably fixed on braking disc 6. The reason for this is that there are three support points namely two where the V-shaped edge of plate 7 contacts wall 3 of the hub end part and the location where the mutter clamps the whole assembly in place. On plate 7 a brace 10 has been welded which is formed by two vertical legs 11, which at their upper ends are connected with each other, with a rod 12 being welded to them (see also FIG. 3). This rod 12 can cooperate with a two pronged or other fork 13, which has for instance an external cylindrical shape, and internally a recess running from below upward and having mutual parallel surfaces at a mutual distance which is slightly greater than the diameter of rod 12.

Because after pressing the V-shaped recess against wall 3 the assembly is always oriented so that the rod 12 lies exactly above the rotational axis 1, it is possible to provide that the oblong hole 8 has a slightly greater smallest dimension than that which corresponds to the diameter of the wheel bolt. For this reason the possibility exists of using the coupling member if desired for wheel bolts having a greater diameter, or that any play between the wheel bolt and the longitudinal walls of the oblong hole 8 never can cause the center line of rod 12 not to pass through rotational axis 1.

Because the junction of the wall 3 and the abutment surface 2 may have a rounded shape the walls of the V are chamfered at their lower sides, as has been indicated at 15 with interrupted lines.

In the illustrated embodiment a construction has been shown with an unitary cast braking disc. Also constructions exist wherein the braking disc is attached to the wheel support. Also in that instance the invention is applicable without more. Further it will be appreciated that the V-shaped recess is easily suitable for wheel hub bosses of different diameters, for instance from forty to seventy millimeters. The oblong shape of the hole 8 enables adaption thereof for different purposes and this oblong shape moreover means that adaption is possible for different distances between the rotational axis and the center lines of the wheel bolts.

I claim:

1. In a wheel support of a vehicle wherein the wheel support includes a plurality of wheel bolts which protrude outwardly from a substantially planar abutment surface and which are arranged symmetrically in a circular pattern with respect to the rotational axis of the wheel support, and a central hub end part positioned coaxially with respect to the rotational axis of the wheel, a coupling member including abutment surface in engagement with the abutment surface of the wheel support and a single oblong opening through which a said wheel bolt passes, said coupling member further including a V-shaped edge, with the line of symmetry of the V substantially coinciding with the longer dimension of the oblong opening, said coupling member further including a connecting member which is symmetrical with respect to a plane passing through said line of symmetry and perpendicular to the abutment surface of the coupling member.

2. A wheel support according to claim 1, wherein the connecting member includes a straight rod parallel to the abutment surface of the coupling member.

3. A wheel support according to claim 2, wherein that the rod has a circular cross-section.

4. A wheel support according to claim 1, wherein the connecting member is connected by means of a brace to a plate part having a surface which forms the abutment surface of the coupling member, the connection provided by the brace being such as to provide some free space at both sides of the oblong opening.

5. A wheel support according to claim 1, wherein that the walls of the V are chamfered toward the abutment surface of the coupling member.

6. Driving device for a wheel support according to claim 1, wherein a motor driving device is provided with an output shaft, which at its end bears a fork adapted to encompass the connecting member of the coupling member.

7. A coupling member for a wheel support, said coupling member having a substantially planar abutment surface, at least one oblong hole formed therein having a longer diameter and a shorter diameter, and a V-shaped edge, the line of symmetry of the V-shaped edge coinciding with the longer diameter of said oblong hole and said coupling member further comprising a connecting member which is symmetrical with respect to a plane passing through said line of symmetry and perpendicular to said abutment surface.

8. A coupling member according to claim 7 wherein said connecting member includes a straight rod parallel to the abutment surface of the coupling member.

9. A coupling member according to claim 8 wherein said rod has a circular cross-section.

10. A coupling member according to claim 7 wherein said connecting member is connected by means of a brace to a plate portion of said coupling member having a surface which forms the abutment surface of said coupling member, the connection provided by the brace being such as to provide some free space at both sides of the oblong opening.

11. A coupling member according to claim 7 wherein the walls of the V-shaped edge are chamfered towards the abutment surface of the coupling member.

* * * * *